(12) United States Patent   (10) Patent No.: US 9,590,254 B2
Sugiura et al.                  (45) Date of Patent:    Mar. 7, 2017

(54) FUEL CELL STACK

(75) Inventors: Seiji Sugiura, Utsunomiya (JP);
Narutoshi Sugita, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1560 days.

(21) Appl. No.: 12/542,064

(22) Filed: Aug. 17, 2009

(65) Prior Publication Data

US 2010/0055540 A1    Mar. 4, 2010

(30) Foreign Application Priority Data

Aug. 27, 2008 (JP) ................. 2008-217642

(51) Int. Cl.

| H01M 8/0254 | (2016.01) |
|---|---|
| H01M 8/0267 | (2016.01) |
| H01M 8/02 | (2016.01) |
| H01M 8/04 | (2016.01) |
| H01M 8/10 | (2016.01) |

(52) U.S. Cl.
CPC ....... *H01M 8/0206* (2013.01); *H01M 8/0254* (2013.01); *H01M 8/0267* (2013.01); *H01M 8/04074* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| 2005/0221158 A1* | 10/2005 | Yamauchi et al. ............. 429/38 |
| 2005/0255364 A1 | 11/2005 | Cho et al. |
| 2009/0169964 A1* | 7/2009 | Ikeda ............................. 429/34 |

FOREIGN PATENT DOCUMENTS

| JP | 8-222237 | 8/1996 |
| JP | 2007165257 A * | 6/2007 |

* cited by examiner

*Primary Examiner* — Krishnan S Menon
(74) *Attorney, Agent, or Firm* — Nelson Mullins Riley & Scarborough LLP; Anthony A. Laurentano

(57) ABSTRACT

In a power generation unit of a fuel cell stack, bosses of a first metal separator and bosses of a second metal separator are provided to sandwich a first membrane electrode assembly at first sandwiching positions on both sides of the first membrane electrode assembly, oppositely to each other in a stacking direction. Bosses of a second metal separator and bosses of a third metal separator are provided to sandwich a second membrane electrode assembly at second sandwiching positions on both sides of the second membrane electrode assembly, oppositely to each other in the stacking direction. Bosses of the first metal separator and bosses of the third metal separator protrude toward a coolant flow field, and contact each other at positions offset from the first and second sandwiching positions.

4 Claims, 6 Drawing Sheets

FUEL CELL STACK

CROSS-REFERENCE TO RELATED APPLICATION

This application is based upon and claims the benefit of priority from Patent Application No. 2008-217642 filed on Aug. 27, 2008, in the Japan Patent Office, of which the contents are incorporated herein by reference.

BACKGROUND OF THE INVENTION

Field of the Invention

The present invention relates to a fuel cell stack including a plurality of power generation units. The power generation units are formed by an even number of electrolyte electrode assemblies and metal separators stacked alternately with the electrolyte electrode assemblies. Each of the electrolyte electrode assemblies includes a cathode, an anode, and an electrolyte interposed between the cathode and the anode. The power generation units have an oxygen-containing gas flow field for supplying an oxygen-containing gas to the cathode and a fuel gas flow field for supplying a fuel gas to the anode. A buffer having an uneven shape is formed at least at one of a flow field outlet and a flow field inlet of the oxygen-containing gas flow field and at least at one of a flow field outlet and a flow field inlet of the fuel gas flow field. A coolant flow field is formed in each space between the power generation units.

Description of the Related Art

For example, a solid polymer electrolyte fuel cell employs a polymer electrolyte membrane. The solid polymer electrolyte membrane is a polymer ion exchange membrane. The electrolyte membrane is interposed between an anode and a cathode to form a membrane electrode assembly (MEA). The membrane electrode assembly is sandwiched between a pair of separators to form a unit cell. In use, normally a predetermined number of unit cells are stacked together to form a fuel cell stack.

In the fuel cell, a fuel gas flow field is formed in a surface of one separator facing the anode for supplying a fuel gas to the anode, and an oxygen-containing gas flow field is formed in a surface of the other separator facing the cathode for supplying an oxygen-containing gas to the cathode. Further, a coolant flow field is formed between the separators for supplying a coolant along surfaces of the separators.

In the case where metal separators are used as the separators, by providing grooves as a fuel gas flow field on one surface of the metal separator facing the anode, ridges as the back side of the grooves are formed on the other surface of the metal separator. Further, by forming grooves as an oxygen-containing gas flow field on one surface of the metal separator facing the cathode, ridges as the back side of the grooves are formed on the other surface of the metal separator.

For example, as disclosed in Japanese Laid-Open Patent Publication No. 08-222237, in a fuel cell stack formed by stacking a plurality of fuel cells each including a solid electrolyte and electrodes on both sides of the solid electrolyte, a known fuel cell separator interposed between the fuel cells has fuel gas flow grooves on one surface for supplying a fuel gas to one of the adjacent fuel cells, and has an oxygen-containing gas flow grooves on the other surface for supplying an oxygen-containing gas to the other of the adjacent fuel cells.

This separator is made of metal material having good workability, and material having good electrical conductivity is coated on both of front and back sides of the metal material. Further, a large number of projections are provided on front and back surfaces of the separator at suitable intervals. In the fuel cell stack, the projections contact the fuel cell surface, and the fuel gas flow grooves and the oxygen-containing gas flow grooves are formed between the separators and the adjacent fuel cells, respectively, and between the projections.

The fuel cell stack may adopt so called skip cooling structure where the coolant flow field is formed at intervals of a predetermined number of unit cells. In the case where the above conventional technique is adopted in the fuel cell having the skip cooling structure of this type, as shown in FIG. 6, cell units 3 each including two MEAs 1a, 1b, and three metal separators 2a, 2b, 2c are stacked together.

Each of the MEA 1a, 1b includes an anode 4b, a cathode 4c, and a solid electrolyte membrane 4a interposed between the anode 4b and the cathode 4c. The metal separator 2a has a plurality of ridges 5a forming a fuel gas flow field 5 for supplying a fuel gas to the anode 4b of the MEA 1a. The metal separator 2b has a plurality of ridges 6a forming an oxygen-containing gas flow field 6 for supplying an oxygen-containing gas to the cathode 4c of the MEA 1a and a plurality of ridges 5a forming a fuel gas flow field 5 for supplying a fuel gas to the anode 4b of the MEA 1b alternately.

The metal separator 2c has a plurality of ridges 6a forming an oxygen-containing gas flow field 6 for supplying an oxygen-containing gas to the cathode 4c of the MEA 1b. A coolant flow field 7 for supplying a coolant is formed between the adjacent metal separators 2a, 2c.

In the metal separators 2a, 2b, the MEA 1a is sandwiched between the ridges 5a, 6a provided at the same positions, i.e., in alignment with each other in the stacking direction. In the metal separator 2b, 2c, the MEA 1b is sandwiched between the ridges 5a, 6a provided at the same position, i.e., in alignment with each other in the stacking direction.

However, though the coolant flow field 7 is formed between the cell units 3, since the ridges and grooves are provided oppositely in the stacking direction in the coolant flow field 7, the metal separators 2c, 2a are not fixedly positioned in the stacking direction. In the structure, the load at the time of stacking components of the fuel cell stack cannot be supported between the cell units 3. Further, the coolant flow field 7 is not tolerant of pressure change during power generation.

Further, the fuel cell stack may be damaged undesirably due to deformation of the MEA 1a, 1b and the metal separators 2a to 2c. Accordingly, electrical conductance between the cell units 3 is poor.

SUMMARY OF THE INVENTION

An object of the present invention is to provide a fuel cell stack for the fuel cell having skip cooling structure of this type, in which, with simple and economical structure, it is possible to reliably retain the structure of components between power generation units forming a coolant flow field, and suitably prevent deformation of electrolyte electrode assemblies and metal separators.

The present invention relates to a fuel cell stack including a plurality of power generation units. The power generation units are formed by an even number of electrolyte electrode assemblies and metal separators stacked alternately with the electrolyte electrode assemblies. Each of the electrolyte electrode assemblies includes a cathode, an anode, and an electrolyte interposed between the cathode and the anode.

The power generation units have an oxygen-containing gas flow field for supplying an oxygen-containing gas to the cathode and a fuel gas flow field for supplying a fuel gas to the anode. Buffers having an uneven shape are formed at least at one of a flow field outlet and a flow field inlet of the oxygen-containing gas flow field and at least at one of a flow field outlet and a flow field inlet of the fuel gas flow field. A coolant flow field is formed in each space between the power generation units.

In the buffers, first bosses are provided adjacent to the oxygen-containing gas flow field and second bosses are provided adjacent to the fuel gas flow field such that the first bosses and the second bosses are positioned to sandwich the electrolyte electrode assembly at sandwiching positions on both sides of the electrolyte electrode assembly oppositely to each other in the stacking direction. The sandwiching positions of the first bosses and the second bosses are offset from each other in each of the adjacent electrolyte electrode assemblies as viewed from the stacking direction.

Third bosses and fourth bosses are provided in a pair of the adjacent the metal separators forming the coolant flow field, and the third bosses and the fourth bosses contact each other at contact positions.

The contact positions of the third bosses and the fourth bosses are offset from the sandwiching positions of the first bosses and the second bosses as viewed from the stacking direction.

According to the present invention, in the power generation unit, the first bosses and the second bosses of the buffers contacting each of the electrolyte electrode assemblies are provided oppositely to each other in the stacking direction. In the structure, no shearing force is applied to the electrolyte electrode assemblies, and damages of the electrolyte electrode assemblies can be prevented advantageously.

Further, in the pair of metal separators forming the coolant flow field, the third bosses and the fourth bosses protrude toward the coolant flow field, at positions offset from the sandwiching positions of the first bosses and the second bosses, and the third and fourth bosses contact each other. In the structure, since the third bosses and the fourth bosses contact each other in the stacking direction, the fuel cell stack has structure where load in the stacking direction is supported and the pressure change during power generation is allowed.

Further, simply by stacking a plurality of the same power generation units, the coolant flow field is formed in each space between the power generation units, and thus, the fuel cell stack having the coolant flow field with skip cooling structure is produced easily. Accordingly, since the number of common components is increased, the number of components is reduced as a whole. The fuel cell stack can be produced economically, and significant improvement in the performance of assembling the fuel cell stack is achieved.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
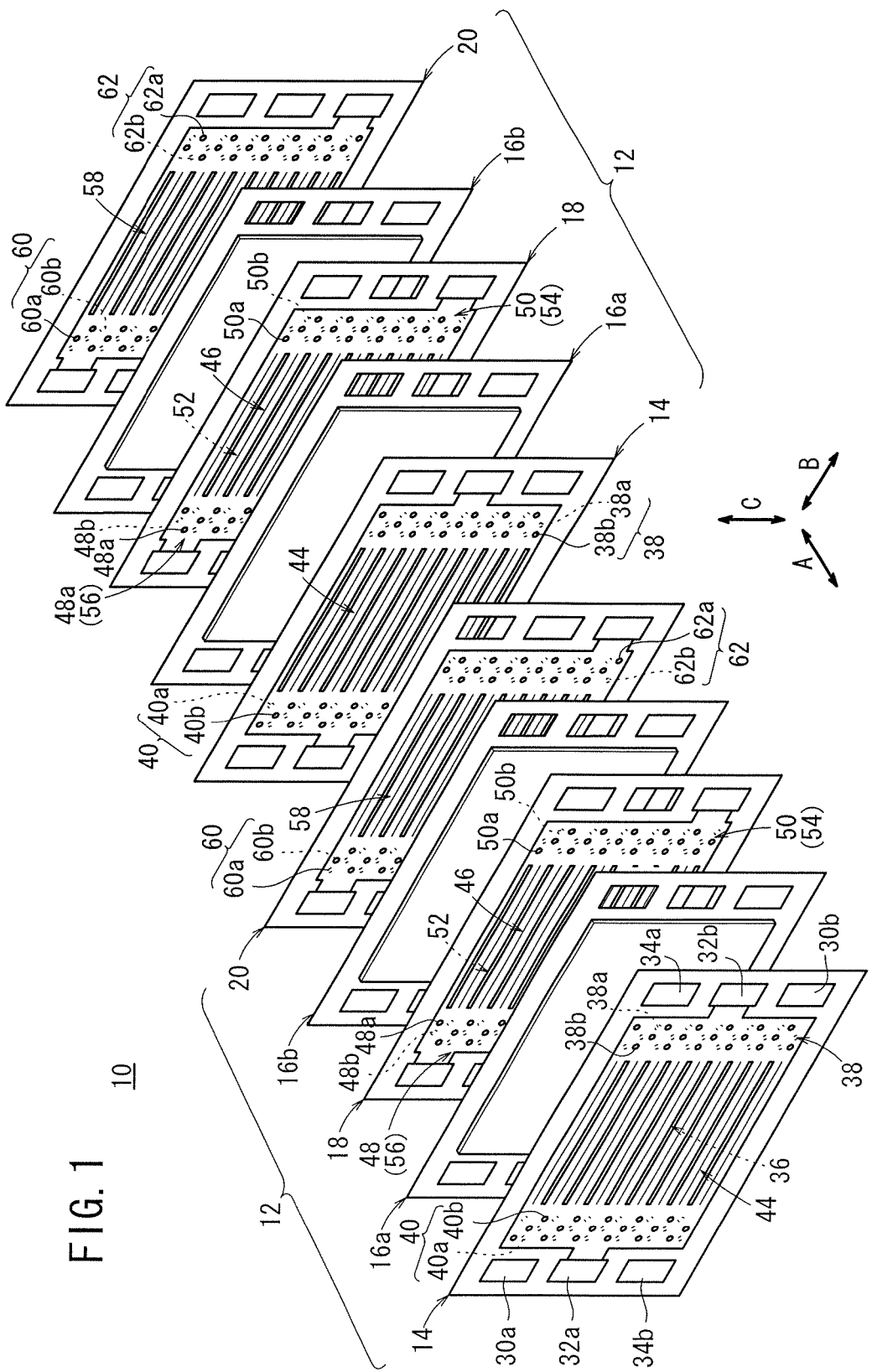
FIG. 1 is an exploded perspective view schematically showing main components of a fuel cell stack according to an embodiment of the present invention.
Figure 2:
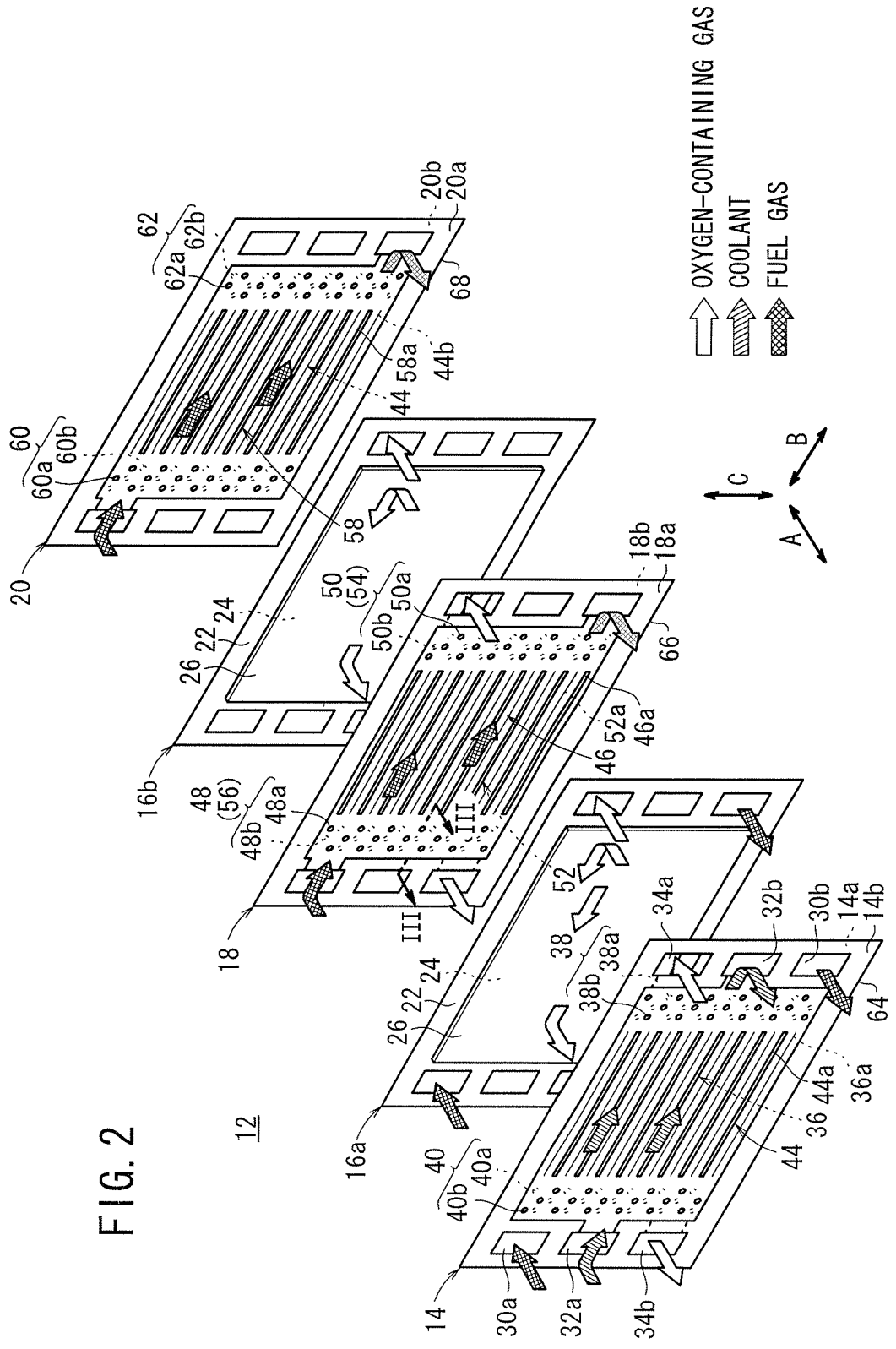
FIG. 2 is a perspective view showing main components of a power generation unit of the fuel cell stack.
Figure 3:
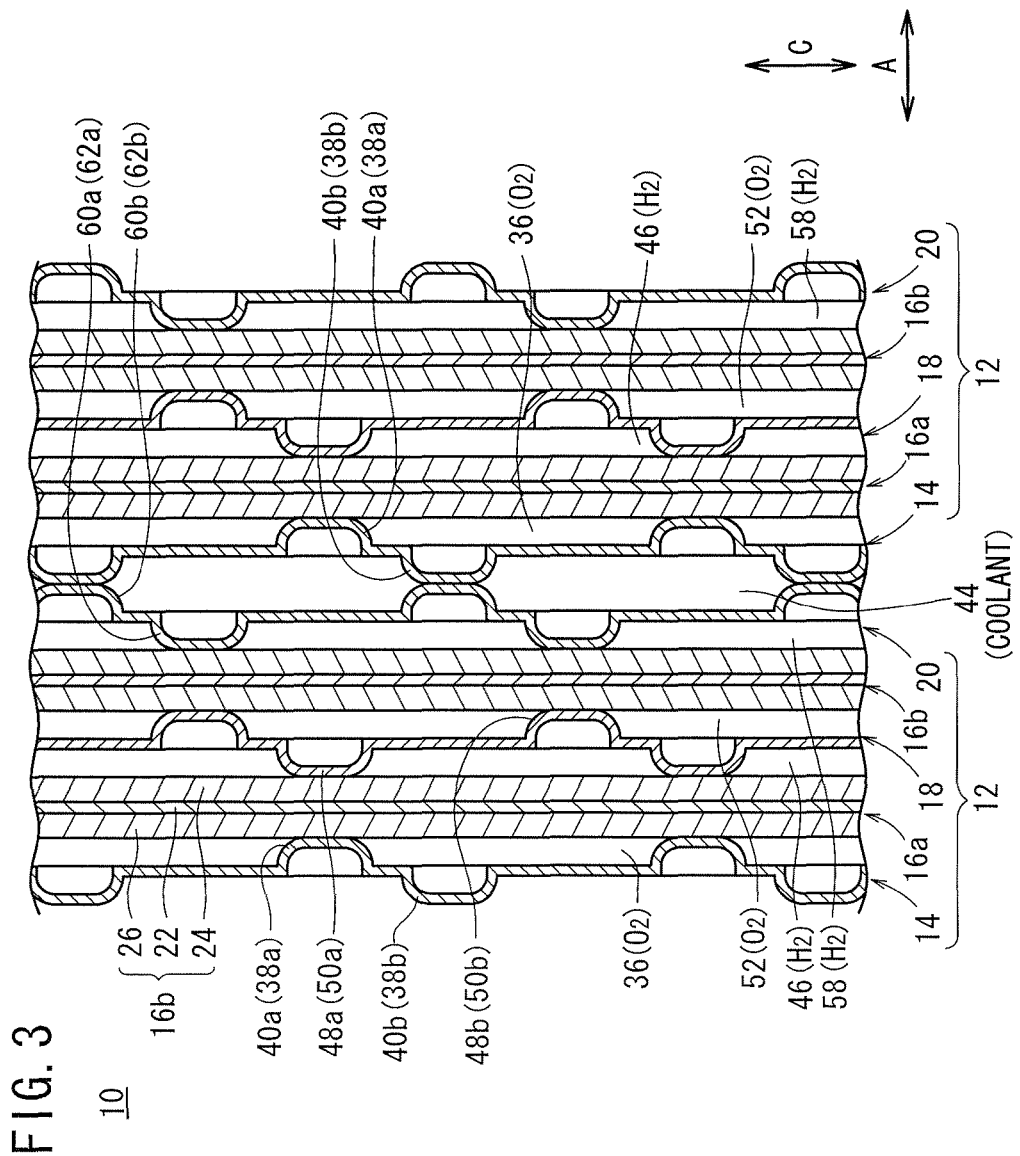
FIG. 3 is a cross sectional view showing the fuel cell stack, taken along a line III-III in FIG. 2.

As shown in FIG. 1, a fuel cell stack 10 according to an embodiment of the present invention is formed by stacking a plurality of power generation units 12 in a horizontal direction indicated by an arrow A. As shown in FIGS. 1 to 3, each of the power generation units 12 includes a first metal separator 14, a first membrane electrode assembly (electrolyte electrode assembly) (MEA) 16a, a second metal separator 18, a second membrane electrode assembly 16b, and a third metal separator 20.

The power generation unit 12 should have an even number of MEAs. For example, four MEAs may be included in the power generation unit 12. In this case, the four MEAs and five separators are stacked alternately.

For example, the first metal separator 14, the second metal separator 18, and the third metal separator 20 are made of steel plates, stainless steel plates, aluminum plates, plated steel sheets, or metal plates having anti-corrosive surfaces by surface treatment. The first metal separator 14, the second metal separator 18, and the third metal separator 20 are formed by corrugating metal thin plates under pressure forming to have ridges and grooves.

Each of the first and second membrane electrode assemblies 16a, 16b includes an anode 24, a cathode 26, and a solid polymer electrolyte membrane 22 interposed between the anode 24 and the cathode 26. The solid polymer electrolyte membrane 22 is formed by impregnating a thin membrane of perfluorosulfonic acid with water, for example.

Each of the anode 24 and the cathode 26 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 24 and the electrode catalyst layer of the cathode 26 are fixed to both surfaces of the solid polymer electrolyte membrane 22, respectively.

As shown in FIG. 2, at one end of the power generation unit 12 in a longitudinal direction indicated by the arrow B, a fuel gas supply passage 30a for supplying a fuel gas such as a hydrogen containing gas, a coolant supply passage 32a for supplying a coolant, and an oxygen-containing gas discharge passage 34b for discharging an oxygen-containing gas are provided. The fuel gas supply passage 30a, the coolant supply passage 32a, and the oxygen-containing gas discharge passage 34b extend through the power generation unit 12 in the direction indicated by the arrow A.

At the other end of the power generation unit 12 in the longitudinal direction indicated by the arrow B, an oxygen-containing gas supply passage 34a for supplying the oxygen-containing gas, a coolant discharge passage 32b for discharging the coolant, and a fuel gas discharge passage 30b for discharging the fuel gas are provided.

The first metal separator 14 has a first oxygen-containing gas flow field 36 on a surface 14a facing the first membrane electrode assembly 16a. The first oxygen-containing gas flow field 36 is connected between the oxygen-containing gas supply passage 34a and the oxygen-containing gas discharge passage 34b. The first oxygen-containing gas flow field 36 includes a plurality of flow grooves 36a extending in the direction indicated by the arrow B.

Figure 4:
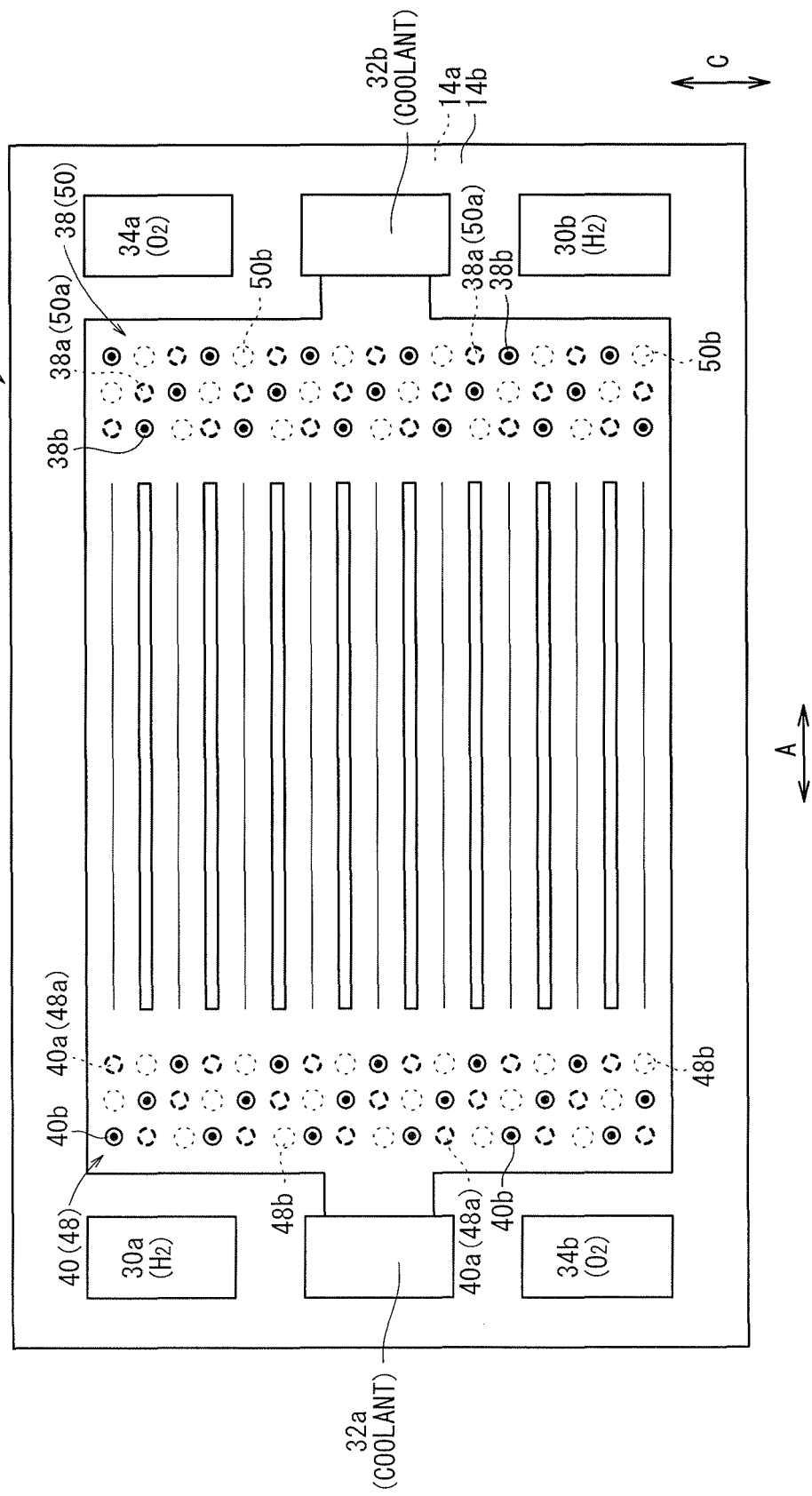
FIG. 4 is a view showing buffers of first and second metal separators of the power generation cell.

At least one of an inlet buffer 38 and an outlet buffer 40 is provided adjacent to the inlet or the outlet of the first oxygen-containing gas flow field 36. Each of the inlet buffer 38 and the outlet buffer 40 has an uneven shape, i.e., including bosses protruding from both of the front and back surfaces of the first metal separator 14 in the inlet buffer 38 and the outlet buffer 40. As shown in FIGS. 2, 3, and 4, the inlet buffer 38 has a plurality of bosses (first bosses) 38a protruding from the surface 14a facing the first membrane electrode assembly 16a and a plurality of bosses (fourth bosses) 38b protruding from the surface 14b facing a coolant flow field 44 (as described later). The bosses 38a and the bosses 38b are arranged in at least in two rows (in the illustrated embodiment, three rows). Three adjacent bosses from each row are arranged obliquely and closely to each other.

The outlet buffer 40 has a plurality of bosses (first bosses) 40a protruding from the surface 14a and a plurality of bosses (fourth bosses) 40b protruding from the surface 14b. The bosses 40a, 40b are arranged in three rows. Three adjacent bosses from each row are arranged obliquely and closely to each other. The bosses 38a, 38b, 40a, 40b can be formed in various shapes such as a circular shape, an oval shape, and a rectangular shape. The bosses described later may be formed in various shapes as well.

Part of the coolant flow field 44 is formed on the surface 14b of the first metal separator 14. The coolant flow field 44 is connected between the coolant supply passage 32a and the coolant discharge passage 32b. A plurality of flow grooves (recesses) 44a are formed on the surface 14b as the back surface of the flow grooves 36a of the first oxygen-containing gas flow field 36. The back surfaces of the buffers having bosses 40b, 38b are provided adjacent to the inlet and the outlet of the flow grooves 44a.

The second metal separator 18 has a first fuel gas flow field 46 on a surface 18a facing the first membrane electrode assembly 16a. The first fuel gas flow field 46 is connected between the fuel gas supply passage 30a and the fuel gas discharge passage 30b. The first fuel gas flow field 46 has a plurality of flow grooves (recesses) 46a extending in the direction indicated by the arrow B, and an inlet buffer 48 and an outlet buffer 50 are provided adjacent to the inlet and the outlet of the first fuel gas flow field 46.

Figure 5:
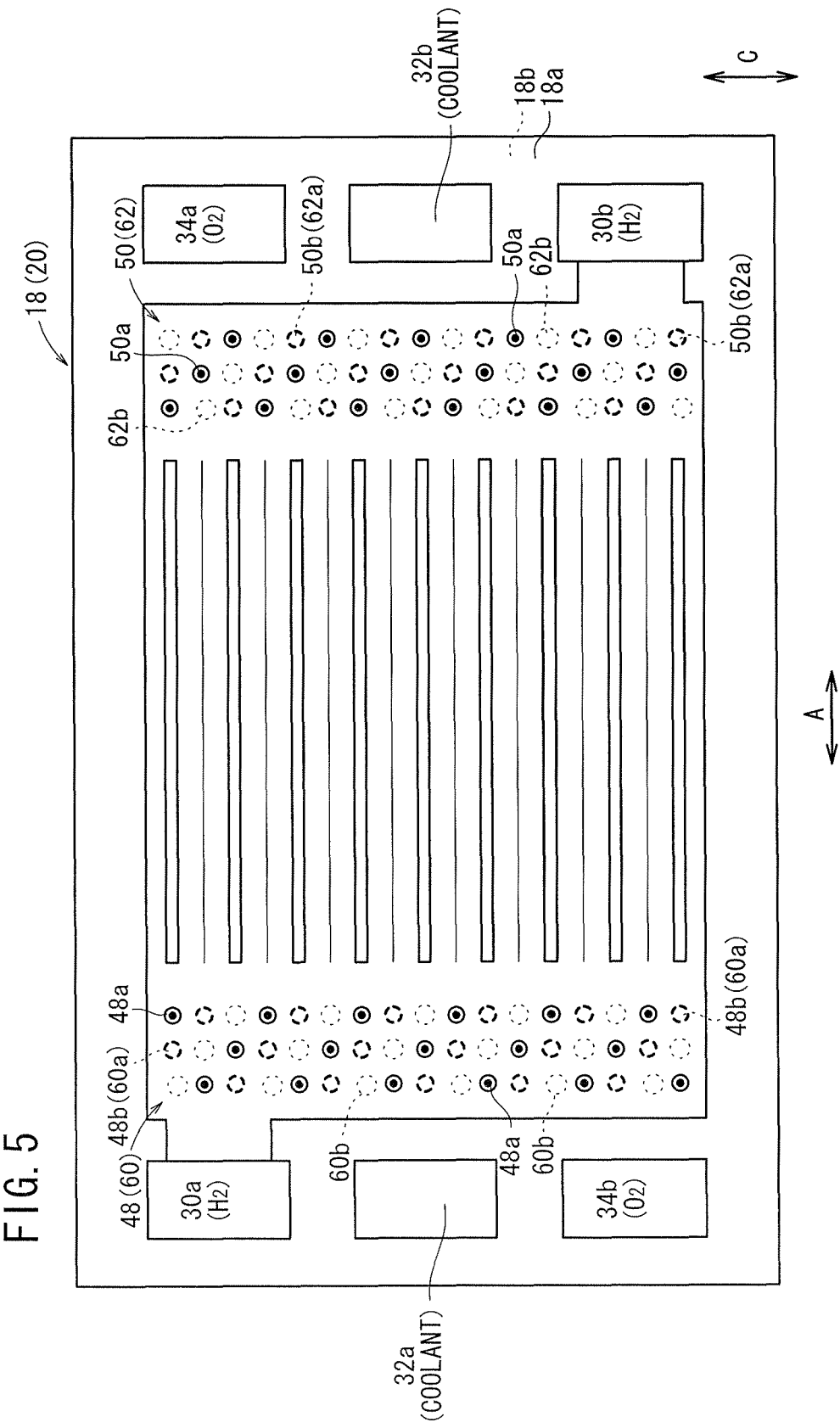
FIG. 5 is a view showing buffers of second and third metal separators of the power generation cell.
Figure 6:
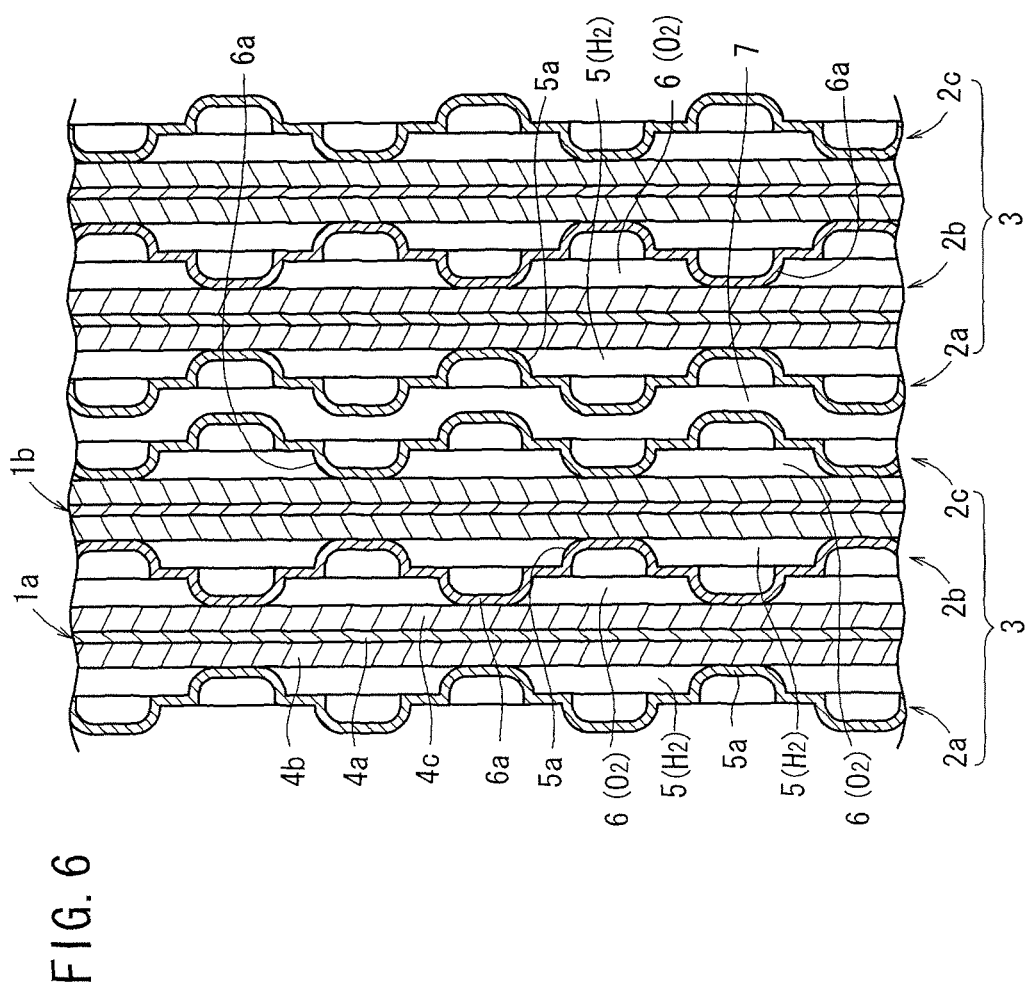
FIG. 6 is a view showing a conventional fuel cell stack.

As shown in FIGS. 2, 3, and 5, each of the inlet buffer 48 and the outlet buffer 50 has an uneven shape, i.e., bosses protruding from both of the front and back surfaces of the second metal separator 18 in the inlet buffer 48 and the outlet buffer 50. The inlet buffer 48 has a plurality of bosses (second bosses) 48a, 50a protruding from the surface 18a facing the first membrane electrode assembly 16a and a plurality of bosses (first bosses) 48b, 50b protruding from the surface 18b facing the second membrane electrode assembly 16b.

The second metal separator 18 has a second oxygen-containing gas flow field 52 on a surface 18b facing the second membrane electrode assembly 16b. The second oxygen-containing gas flow field 52 is connected between the oxygen-containing gas supply passage 34a and the oxygen-containing gas discharge passage 34b. The second oxygen-containing gas flow field 52 has a plurality of grooves (recesses) 52a extending in the direction indicated by the arrow B. An inlet buffer 54 and an outlet buffer 56 are provided adjacent to the inlet and the outlet of the second oxygen-containing gas flow field 52. The inlet buffer 54 and the outlet buffer 56 are formed on the back surfaces of the outlet buffer 50 and the inlet buffer 48.

As shown in FIGS. 3 and 4, in the first metal separator 14 and the second metal separator 18, the bosses 38a, 40a, and the bosses 50a, 48a are provided to sandwich the first membrane electrode assembly 16a at first sandwiching positions on both sides of the first membrane electrode assembly 16a, oppositely in the direction indicated by the arrow A. The bosses 38b, 40b of the first metal separator 14 are provided at positions corresponding to flat portions between the bosses 50a, 50b and flat portions between the bosses 48a, 48b of the second metal separator 18. The bosses 50b, 48b of the second metal separator 18 are provided at positions corresponding to flat portions between the bosses 38a, 38b and flat portions between the bosses 40a, 40b of the first metal separator 14.

The third metal separator 20 has a second fuel gas flow field 58 on a surface 20a facing the second membrane electrode assembly 16b of the third metal separator 20. The second fuel gas flow field 58 is connected between the fuel gas supply passage 30a and the fuel gas discharge passage 30b. The second fuel gas flow field 58 has a plurality of flow grooves (recesses) 58a extending in the direction indicated by the arrow B. An inlet buffer 60 and an outlet buffer 62 are provided adjacent to the inlet and the outlet of the second fuel gas flow field 58.

As shown in FIGS. 2, 3, and 5, bosses protruding from both of the front and back surfaces of the third metal separator 20 in the inlet buffer 60 and the outlet buffer 62. The inlet buffer 60 and the outlet buffer 62 have a plurality of bosses (second bosses) 60a, 62a protruding from the surface 20a facing the second membrane electrode assembly 16b and a plurality of bosses (third bosses) 60b, 62b protruding from the surface 20b facing a coolant flow field 44.

Part of the coolant flow field 44 is formed on the surface 20b of the third metal separator 20. A plurality of flow grooves (recesses) 44b are formed on the surface 20b as the back surface of the flow grooves 58a of the second fuel gas flow field 58.

As shown in FIGS. 3 and 5, in the second metal separator 18 and the third metal separator 20, the bosses 48b, 50b, and the bosses 60a, 62a are provided to sandwich the second membrane electrode assembly 16b at second sandwiching positions on both sides of the second membrane electrode assembly 16b, oppositely in the direction indicated by the arrow A. The bosses 48a, 50a of the second metal separator 18 are provided at positions corresponding to flat portions between the bosses 60a, 60b and flat portions between bosses 62a, 62b of the third metal separator 20. The bosses 60b, 62b of the third metal separator 20 are provided at positions corresponding to flat portions between the bosses 48a, 48b and flat portions between the bosses 50a, 50b of the second metal separator 18.

As shown in FIG. 3, the bosses 40a, 38a of the first metal separator 14 and the bosses 48a, 50a of the second metal separator 18 are provided at the first sandwiching positions (in the same phase) such that the bosses 40a, 38a, and the bosses 48a, 50a are provided oppositely on both sides of the first membrane electrode assembly 16a in the stacking direction. The bosses 48b, 50b of the second metal separator 18 and the bosses 60a, 60b of the third metal separator 20 are provided to sandwich the second membrane electrode assembly 16b at the second sandwiching positions (in the same phase) such that the bosses 48b, 50b and the bosses 60a, 62a are provided oppositely on both sides of the second membrane electrode assembly 16b in the stacking direction. The first sandwiching positions and the second sandwiching positions are offset from each other as viewed from the stacking direction.

In the first and third metal separators 14, 20 forming the coolant flow field 44, the bosses 40b, 38b of the first metal separator 14 and the bosses 60b, 62b of the third metal separator protrude toward, and contact each other. The contact positions of the bosses 40b, 50a and the bosses 60b, 62b are different from the first sandwiching positions of the bosses 40a, 38a, and the bosses 48a, 50a, and the second sandwiching positions of the bosses 48b, 50b and the bosses 60a, 62a, as viewed from the stacking direction.

In the power generation unit 12, when the first membrane electrode assembly 16a is sandwiched between the first metal separator 14 and the second metal separator 18, the first oxygen-containing containing gas flow field 36 and the first fuel gas flow field 46 provided oppositely have ridges between the flow grooves 36a, 46a at the same positions as viewed from the stacking direction. Likewise, when the second membrane electrode assembly 16b is sandwiched between the second metal separator 18 and the third metal separator 20, the second oxygen-containing gas flow field 52 and the second fuel gas flow field 58 have ridges between the flow grooves 52a, 58a at the same position as viewed from the stacking direction.

As shown in FIG. 2, a first seal member 64 is formed integrally on the surfaces 14a, 14b of the first metal separator 14, around the outer end of the first metal separator 14, a second seal member 66 is formed integrally on the surfaces 18a, 18b of the second metal separator 18, around the outer end of the second metal separator 18, and a third seal member 68 is formed integrally on the surfaces 20a, 20b of the third metal separator 20, around the outer end of the third metal separator 20.

Operation of the fuel cell stack 10 will be described below.

Firstly, as shown in FIG. 1, an oxygen-containing gas is supplied to the oxygen-containing gas supply passage 34a, and a fuel gas such as a hydrogen-containing gas is supplied to the fuel gas supply passage 30a. Further, a coolant such as pure water, ethylene glycol, or oil is supplied to the coolant supply passage 32a.

Thus, in the power generation unit 12, as shown in FIG. 2, the oxygen-containing gas flows from the oxygen-containing gas supply passage 34a to the first oxygen-containing gas flow field 36 of the first metal separator 14 and the second oxygen-containing gas flow field 52 of the second metal separator 18. The oxygen-containing gas flows along the first oxygen-containing gas flow field 36 in the horizontal direction indicated by the arrow B, and is supplied to the cathode 26 of the first membrane electrode assembly 16a. Further, the oxygen-containing gas flows along the second oxygen-containing gas flow field 52 in the direction indicated by the arrow B, and is supplied to the cathode 26 of the second membrane electrode assembly 16b.

The fuel gas flows from the fuel gas supply passage 30a to the first fuel gas flow field 46 of the second metal separator 18, and is supplied to the anode 24 of the first membrane electrode assembly 16a. Further, the fuel gas flows along the second fuel gas flow field 58 of the third metal separator 20 in the direction indicated by the arrow B, and is supplied to the anode 24 of the second membrane electrode assembly 16b.

Thus, in each of the first and second membrane electrode assemblies 16a, 16b, oxygen-containing gas supplied to the cathode 26, and the fuel gas supplied to the anode 24 are consumed in the electrochemical reactions at catalyst layers of the cathode 26 and the anode 24 for generating electricity.

Then, the oxygen-containing gas after partially consumed at the cathodes 26 of the first and second membrane electrode assemblies 16a, 16b flows along the oxygen-containing gas discharge passage 34b, and is discharged in the direction indicated by the arrow A. Likewise, the fuel gas after partially consumed at the anodes 24 of the first and second membrane electrode assemblies 16a, 16b is discharged to the fuel gas discharge passage 30b.

As shown in FIGS. 2 and 3, the coolant supplied to the coolant supply passage 32a flows into the coolant flow field 44 formed between the third metal separator 20 and the first metal separator 14 of each power generation unit 12. Then, the coolant flows in the direction indicated by the arrow B. After the coolant cools the first and second membrane electrode assemblies 16a, 16b, the coolant is discharged into the coolant discharge passage 32b.

In the embodiment, as shown in FIG. 3, in the first metal separator 14 and the second metal separator 18, the bosses 38a, 40a, and the bosses 50a, 48a are provided to sandwich the first membrane electrode assembly 16a at the first sandwiching positions, on both sides of the first membrane electrode assembly 16a in the stacking direction indicated by the arrow A. Further, in the second metal separator 18 and the third metal separator 20, the bosses 48b, 50b and the bosses 60a, 62a are provided to sandwich the second membrane electrode assembly 16b at the second sandwiching positions on both sides of the second membrane electrode assembly 16b in the stacking direction indicated by the arrow A.

In the structure, no shearing force is applied to the first and second membrane electrode assemblies 16a, 16b, and damages of the first and second membrane electrode assemblies 16a, 16b can be prevented advantageously.

Further, in the first and third metal separator 14, 20 provided adjacent to each other to form the coolant flow field 44, the bosses 40b, 38b of the first metal separator 14 and the bosses 60b, 62b of the third metal separator 20 protrude toward the coolant flow field 44, at positions offset from the first sandwiching positions and the second sandwiching positions, and the bosses 40b, 38b, and the bosses 60b, 62b contact each other in the stacking direction. In the structure, since the bosses 40b, 38b and the bosses 60b, 62b contact each other in the stacking direction, the fuel cell stack 10 have structure where load in the stacking direction is supported, and the pressure change during power generation is tolerated.

Further, simply by stacking a plurality of the same power generation units 12, the coolant flow field 44 is formed in each space between the power generation units 12, and thus, the fuel cell stack 10 having the coolant flow field 44 with skip cooling structure is produced easily. Accordingly, since the number of common components is increased, the number of components is reduced as a whole. The fuel cell stack 10 can be produced economically, and significant improvement in the performance of assembling the fuel cell sack 10 is achieved.

While the invention has been particularly shown and described with reference to a preferred embodiment, it will be understood that variations and modifications can be effected thereto by those skilled in the art without departing from the spirit of the invention as defined by the appended claims.

What is claimed is:

1. A fuel cell stack comprising:
a plurality of power generation units, each of the power generation units comprising:
an even number of electrolyte electrode assemblies and metal separators stacked alternately with the electrolyte electrode assemblies, wherein the electrolyte electrode assemblies each include a cathode, an anode, and an electrolyte interposed between the cathode and the anode, wherein the metal separators comprise:
first bosses that are adjacent to an oxygen-containing gas flow field and second bosses that are adjacent to a fuel gas flow field such that:
one of the first bosses and one of the second bosses are positioned to sandwich a first electrolyte electrode assembly at a first sandwiching position on opposing sides of the first electrolyte electrode assembly; and
another of the first bosses and another of the second bosses are positioned to sandwich a second electrolyte electrode assembly at a second sandwiching position on opposing sides of the second electrolyte electrode assembly, whereby the second sandwiching position is offset from the first sandwiching position; and
third bosses and fourth bosses that are in a pair of separators of adjacent power generation units for forming the coolant flow field, and the third bosses and the fourth bosses contact each other at contact positions; and
wherein the contact positions of the third bosses and the fourth bosses are offset from the first and second sandwiching positions of the first bosses and the second bosses as viewed from the stacking direction.

2. A fuel cell stack according to claim 1, wherein the power generation unit includes first and second electrolyte electrode assemblies;
the first electrolyte electrode assembly is stacked on the first metal separator, the second metal separator is stacked on the first electrolyte electrode assembly, the second electrolyte electrode assembly is stacked on the second metal separator, and the third metal separator is stacked on the second electrolyte electrode assembly;
the first bosses of the first metal separator and the second bosses of the second metal separator are provided at first sandwiching positions of the first electrolyte electrode assembly;
the first bosses of the second metal separator and the second bosses of the third metal separator are provided at the second sandwiching positions of the second electrolyte electrode assembly;
the third bosses of the third metal separator and the fourth bosses of the first metal separator of the adjacent power generation unit protrude toward the coolant flow field, and contact each other at the contact positions; and
the first sandwiching positions, the second sandwiching positions, and the contact positions are offset from one another as viewed from the stacking direction.

3. A fuel cell stack according to claim 2, wherein the first bosses and the fourth bosses protrude from both of front and back surfaces of the first metal separator;
the second bosses and the first bosses protrude from both of front and back surfaces of the second metal separator; and
the second bosses and the third bosses protrude from both of front and back surfaces of the third metal separator.

4. A fuel cell stack according to claim 1, wherein the power generation units comprise the oxygen-containing gas flow field for supplying an oxygen-containing gas to the cathode and the fuel gas flow field for supplying a fuel gas to the anode, buffers having an uneven shape being formed at least at one of a flow field outlet and a flow field inlet of the oxygen-containing gas flow field and at least at one of a flow field outlet and a flow field inlet of the fuel gas flow field, a coolant flow field being formed in each space between the power generation units.

* * * * *